United States Patent
Kawai et al.

(10) Patent No.: US 9,618,041 B2
(45) Date of Patent: Apr. 11, 2017

(54) NEEDLE ROLLER AND CAGE ASSEMBLY

(71) Applicants: Hiromitsu Kawai, Shizuoka (JP); Rino Fukami, Shizuoka (JP)

(72) Inventors: Hiromitsu Kawai, Shizuoka (JP); Rino Fukami, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/428,020

(22) PCT Filed: Sep. 5, 2013

(86) PCT No.: PCT/JP2013/073947
§ 371 (c)(1),
(2) Date: Mar. 13, 2015

(87) PCT Pub. No.: WO2014/054376
PCT Pub. Date: Apr. 10, 2014

(65) Prior Publication Data
US 2015/0252849 A1 Sep. 10, 2015

(30) Foreign Application Priority Data
Oct. 5, 2012 (JP) .................................. 2012-223085

(51) Int. Cl.
*F16C 33/46* (2006.01)
*F16C 33/54* (2006.01)
(Continued)

(52) U.S. Cl.
CPC ........ *F16C 33/4676* (2013.01); *F16C 33/541* (2013.01); *F16C 33/545* (2013.01);
(Continued)

(58) Field of Classification Search
CPC ................ F16C 33/4623; F16C 33/467; F16C 33/4676; F16C 33/4682; F16C 33/541; F16C 33/546
(Continued)

(56) References Cited

U.S. PATENT DOCUMENTS 3,797,083 A    3/1974   Schaeffler et al.
3,892,447 A * 7/1975   Gruber ................ B29C 45/2628
                                                                      16/DIG. 27
(Continued)

FOREIGN PATENT DOCUMENTS

CN        101137854      3/2008
DE        2147170       3/1973
(Continued)

OTHER PUBLICATIONS

International Search Report issued Dec. 10, 2013 in International (PCT) Application No. PCT/JP2013/073947.
(Continued)

*Primary Examiner* — Phillip A Johnson
(74) *Attorney, Agent, or Firm* — Wenderoth, Lind & Ponack, L.L.P.

(57) ABSTRACT

A needle roller and cage assembly include a cage having a width larger than a diameter thereof. Pillar sections of the cage each include roller retaining portions on radially inner and outer sides with respect to a roller pitch circle diameter and an oblique portion through which the roller retaining portions are continuous with each other. The oblique portion includes a first relief portion formed therein, for avoiding interference with a needle roller. The adjacent pillar sections form a pocket having a rectangular shape therebetween. The pocket includes a second relief portion in each of four corners thereof. The second relief portion extends in the axial direction of the cage from a position at which a short
(Continued)

side of the pocket is elongated in a circumferential direction of the cage to an outer end of the roller retaining portion on the radially outer side.

16 Claims, 4 Drawing Sheets

(51) Int. Cl.
 *F16C 33/66* (2006.01)
 *F16C 19/46* (2006.01)
 *F16H 57/08* (2006.01)

(52) U.S. Cl.
 CPC .......... *F16C 19/463* (2013.01); *F16C 33/546* (2013.01); *F16C 33/6677* (2013.01); *F16C 33/6681* (2013.01); *F16C 2361/61* (2013.01); *F16H 57/08* (2013.01); *F16H 2057/085* (2013.01)

(58) Field of Classification Search
 USPC .......................................... 384/572, 576, 580
 See application file for complete search history.

(56) References Cited

U.S. PATENT DOCUMENTS

| 6,007,254 | A | 12/1999 | Fujioka et al. | |
|---|---|---|---|---|
| 6,367,983 | B1* | 4/2002 | Muntnich | F16C 19/44 29/898.067 |
| 2002/0181821 | A1 | 12/2002 | Fugel et al. | |
| 2006/0065488 | A1 | 3/2006 | Sugihara et al. | |
| 2007/0297707 | A1* | 12/2007 | Hayashi | B21D 53/12 384/572 |
| 2008/0181549 | A1 | 7/2008 | Nakano et al. | |
| 2009/0003751 | A1* | 1/2009 | Auffahrt | F16C 19/46 384/575 |
| 2016/0025135 | A1 | 1/2016 | Ishibashi | |

FOREIGN PATENT DOCUMENTS

| DE | 19843631 | 4/1999 |
|---|---|---|
| DE | 10109953 | 11/2001 |
| EP | 2 963 308 | 1/2016 |
| JP | 6-73441 | 10/1994 |
| JP | 7-103240 | 4/1995 |
| JP | 2002-364651 | 12/2002 |
| JP | 2005-172187 | 6/2005 |
| JP | 2006-90458 | 4/2006 |
| JP | 2007-064305 | 3/2007 |
| JP | 2007-71344 | 3/2007 |
| JP | 2009-041757 | 2/2009 |
| JP | 2009-68677 | 4/2009 |
| JP | 2009-115300 | 5/2009 |
| JP | 2010-96302 | 4/2010 |
| JP | 2010-270884 | 12/2010 |

OTHER PUBLICATIONS

International Preliminary Report on Patentability and Written Opinion of the International Searching Authority issued Apr. 7, 2015 in International (PCT) Application No. PCT/JP2013/073947.
Extended European Search Report issued Feb. 3, 2016 in counterpart European Patent Application No. 13843778.5.
Office Action issued Oct. 27, 2016 in corresponding Japanese Application No. 2012-223085, with English translation.
First Office Action issued Aug. 25, 2016 in corresponding Chinese Application No. 201380049739.5, with partial English translation.

* cited by examiner

NEEDLE ROLLER AND CAGE ASSEMBLY

TECHNICAL FIELD

The present invention relates to a needle roller and cage assembly, and more specifically, to an improvement of a cage of a needle roller and cage assembly. The needle roller and cage assembly comprises a plurality of needle rollers and a cage into which the plurality of needle rollers are assembled so as not to be separated from each other. The needle roller and cage assembly is applicable to, for example, a bearing for supporting a pinion of a planetary gear mechanism.

BACKGROUND ART

Planetary gear mechanisms are used for automotive transmissions, and needle roller and cage assemblies are used as bearings for supporting pinions of the planetary gear mechanisms. Referring to FIGS. 5A and 5B, the planetary gear mechanism includes a ring gear (internal gear) 2, a sun gear 4, a plurality of pinions (planetary gears) 6, and a carrier 8. The sun gear 4 is positioned at the center of the large ring gear 2, and the plurality of pinions 6 are interposed between the ring gear 2 and the sun gear 4. The carrier 8 includes pinion shafts 8a, and each pinion shaft 8a supports the pinion 6. Therefore, the pinions 6 can revolve about the sun gear 4 while rotating on their axes.

As illustrated in FIG. 5B, each of the pinions 6 is supported on the pinion shaft 8a in a freely rotatable manner through intermediation of a needle roller and cage assembly 10. The needle roller and cage assembly 10 includes a large number of needle rollers 12 and a cage 14. The needle roller and cage assembly 10 utilizes an outer circumferential surface of the pinion shaft 8a as an inner raceway surface and an inner circumferential surface of the pinion 6 as an outer raceway surface without using a bearing inner race or a bearing outer race. The pinion shaft 8a has an oil lubrication hole 8b formed therein, for supplying lubricating oil. The planetary gear mechanism often has structure of lubricating in the needle roller and cage assembly 10 by drawing-in the lubricating oil through the oil lubrication hole 8b formed in the pinion shaft 8a as described above so as to be guided to the outer circumferential surface of the pinion shaft 8a.

The pinion 6 is relatively easily distorted due to the action of a centrifugal force or a force applied from the sun gear 4 to the pinion shaft 8a. Due to such a condition, in a case of single-row roller, when the pinion shaft 8a is distorted, an edge stress is liable to be generated in an edge portion of the needle roller 12. In addition, in the planetary gear mechanism for a transmission, a helical gear is used. The helical gear has a torsion angle, and hence a thrust is generated. The thrust acts on the bearing as a moment. With this, the gear is inclined, and hence the contact pressure of the roller edge portion is significantly increased, which is also a factor of the generation of the edge stress. In any case, the edge stress shortens the life of the bearing.

Patent Literature 1 discloses a technology of extending the life of the bearing by arranging the needle rollers in three rows or more and causing differences in roller length and crowning amount of the needle roller for each row. For example, the differences are set to such an extent that the roller length is shortened in an outer row than in an inner row (paragraph 0014 and FIG. 4 of Patent Literature 1), and the crowning amount is increased in the outer row that in the inner row (paragraph 0016 and FIGS. 6 and 7 of Patent Literature 1). Patent Literature 2 discloses a planetary gear-type continuously variable transmission in which the planetary gear is supported by two needle bearings, in other words, a plurality of roller rows are provided (paragraphs 0028 and 0029 and FIG. 1 of Patent Literature 2).

The cage of the needle roller and cage assembly includes pockets for receiving the needle rollers, and in general, a relief portion is formed in each of four corners of the pocket mainly in order to relieve stress concentration. As disclosed in Patent Literature 3, the relief portion is normally formed through a drilling process or a milling process, and hence the relief portion often has an arc shape.

CITATION LIST

Patent Literature 1: JP 2005-172187 A
Patent Literature 2: JP 2006-090458 A
Patent Literature 3: JP 2009-068677 A

SUMMARY OF INVENTION

Technical Problems

When the plurality of roller rows are provided as in Patent Literatures 1 and 2, there is a problem in that the number of the assembling steps is increased. In addition, when causing differences in roller length and crowning amount for each roller row, it is necessary to pay close attention during the assembling in order not to mix the rollers having different roller lengths and crowning amounts, and hence the work efficiency is significantly degraded.

Further, during the rotation of the planetary gear mechanism, a centrifugal force, which is generated due to the revolution about the sun gear, acts on the needle rollers, and due to the centrifugal force, the needle rollers each apply a load to the cage. A centrifugal force generated due to the weight of the cage itself also acts on the cage, and due to the centrifugal force, the cage is pressed against the inner circumferential surface of the pinion to rotate together with the pinion. However, the needle rollers revolve at a speed about half of that of the pinion, and hence friction is caused between an outer circumferential surface of the cage (radially outer guide surface) and the inner circumferential surface of the pinion.

Further, in the bearing to be used for supporting the pinion of the planetary gear mechanism, the pinion shaft may be distorted, and hence the edge stress is liable to be generated. In addition, the bearing often has such structure that the lubricating oil is difficult to be supplied thereto. Therefore, the roller end portion is liable to be damaged. To lubricate in the needle roller and cage assembly in the structure of drawing-in the lubricating oil into the oil lubrication hole in the pinion shaft as in Patent Literatures 1 and 2, the lubricating oil, which passes through the oil lubrication hole so as to reach the outer circumferential surface of the pinion shaft, is required to further spread in a longitudinal direction of the needle roller, and hence the lubricating oil may not be sufficiently supplied to the entire needle roller.

Note that, the relief portion formed in each of the four corners of the pocket of the cage generally has an arc shape mainly for the purpose of relieving the stress as well as the process-related reason. In addition, the relief portion is required to avoid interference with the end portion (chamfered portion) of the needle roller, and hence has a limitation on the radius of curvature. For those reasons, the relief portion having the arc shape, which is formed in each of the four corners of the pocket, is less expected to contribute to the lubrication of the roller end portion.

The present invention has an object to solve the above-mentioned problems inherent in the related-art needle roller and cage assembly. Specifically, the present invention has an object to provide a needle roller and cage assembly, which is extended in life without complicating assembling work.

Solution to Problems

In order to solve the problems, one embodiment of the present invention provides a needle roller and cage assembly comprising needle rollers being arranged in a single row and having a width dimension larger than a diameter thereof. Specifically, according to the one embodiment of the present invention, there is provided a needle roller and cage assembly, comprising: a large number of needle rollers arranged in a single row; and a cage having a width larger than a diameter thereof, the cage comprising: a pair of annular sections spaced apart from each other in an axial direction of the cage; and a plurality of pillar sections extending in the axial direction, for coupling the pair of annular sections to each other.

The plurality of pillar sections each comprise: a roller retaining portion on a radially inner side with respect to a roller pitch circle diameter, the roller retaining portion on the radially inner side being formed at a center portion of each of the plurality of pillar sections in the axial direction; a roller retaining portion on a radially outer side with respect to the roller pitch circle diameter, the roller retaining portion on the radially outer side being formed at each end portion of the each of the plurality of pillar sections in the axial direction; and an oblique portion through which the roller retaining portion on the radially inner side and the roller retaining portion on the radially outer side are continuous with each other. The oblique portion comprises a first relief portion formed therein, for avoiding interference with each of the needle rollers.

The plurality of adjacent pillar sections form pockets for receiving the needle rollers therebetween. Each of the pockets has a rectangular shape with its short sides being parallel to the pair of annular sections. The each of the pockets comprises a second relief portion in each of four corners thereof, the second relief portion being formed by partially cutting out the each of the plurality of pillar sections. The second relief portion extends in the axial direction of the cage from a position at which one of the short sides of the each of the pockets is elongated in a circumferential direction of the cage to an outer end of the roller retaining portion on the radially outer side.

A region having a dimension b (hatched part) in FIG. 1B corresponds to a radially outer guide surface. Further, an outer end of the first relief portion corresponds to an inner end of the roller retaining portion on the radially outer side. The "outer end" herein indicates an end close to an end surface of the cage in the axial direction, and the "inner end" indicates an end opposite to the end surface of the cage in the axial direction. Therefore, when an axial dimension of the second relief portion is changed, the position of the outer end of the roller retaining portion on the radially outer side is changed, and therefore an axial dimension of the roller retaining portion on the radially outer side is also changed.

Advantageous Effects of Invention

The needle roller and cage assembly according to the one embodiment of the present invention has the width larger than the diameter thereof, and hence the roller length is large. Therefore, the life can be extended without providing a plurality of roller rows. In addition, the rollers are arranged in the single row, and hence the assembling work is not complicated.

The needle roller and cage assembly comprising the needle rollers being arranged in the single row and having the width larger than the diameter thereof is simplified in assembling than in a case where the plurality of roller rows are provided. However, the roller length is increased, and hence the needle rollers are skewed more significantly, with the result that slippage is liable to occur. That is, the needle roller and cage assembly having the width larger than the diameter thereof has harsh drawbacks as a bearing as compared to a general bearing. The above-mentioned problem of the skew, which is caused when the roller length is increased, is addressed by securing an interval between the roller retaining portions.

Further, in place of the related-art general relief portion having a simple arc shape, the relief portion is formed in each of the four corners of the pocket having the rectangular shape in the cage so as to extend in the axial direction of the cage from the short side of the pocket to the outer end of the roller retaining portion on the radially outer side. With this, the opening area can be secured sufficiently. In this manner, oil lubrication performance of the roller end portion is improved. The lubricating oil is sufficiently supplied to a part of the roller end portion, at which the edge stress is liable to be generated, so as to form an oil film. In this manner, the life of the needle roller and cage assembly can be extended. That is, the relief portion increased in opening area is formed at a position of the pocket directly on the short side thereof, with the result that the lubricating oil is guided to a portion between the radially outer guide surface and an inner circumferential surface of the pinion through the relief portion. With this, the oil film can be formed between the outer circumferential surface (radially outer guide surface) of the cage and the inner circumferential surface of the pinion so as to reduce the friction, which also contributes to the extension of the life of the needle roller and cage assembly.

DESCRIPTION OF EMBODIMENT

Now, an embodiment of the present invention is described in detail referring to the accompanying drawings.

Figure 2A:
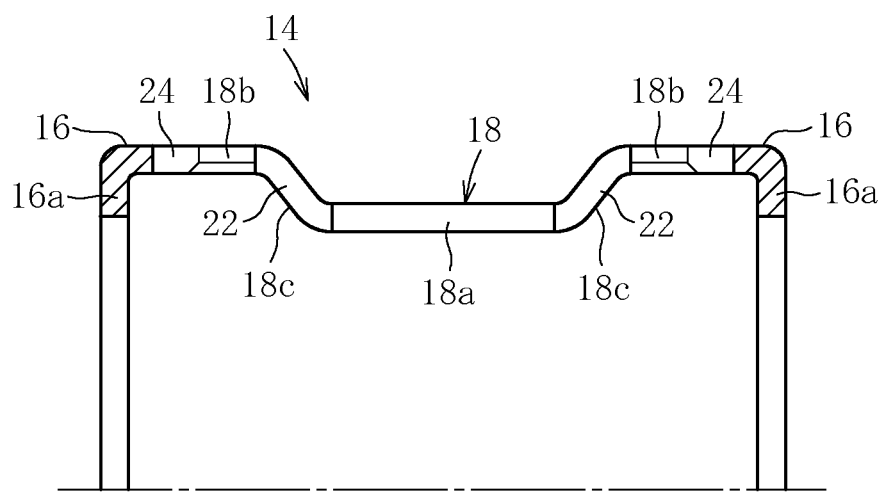
FIG. 2A is a sectional view of an M-shaped cage.
Figure 2B:
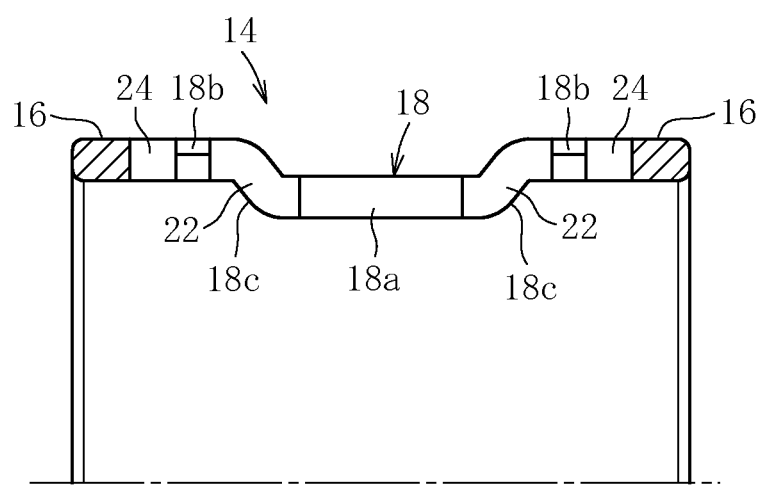
FIG. 2B is a sectional view of a V-shaped cage.
Figure 3:
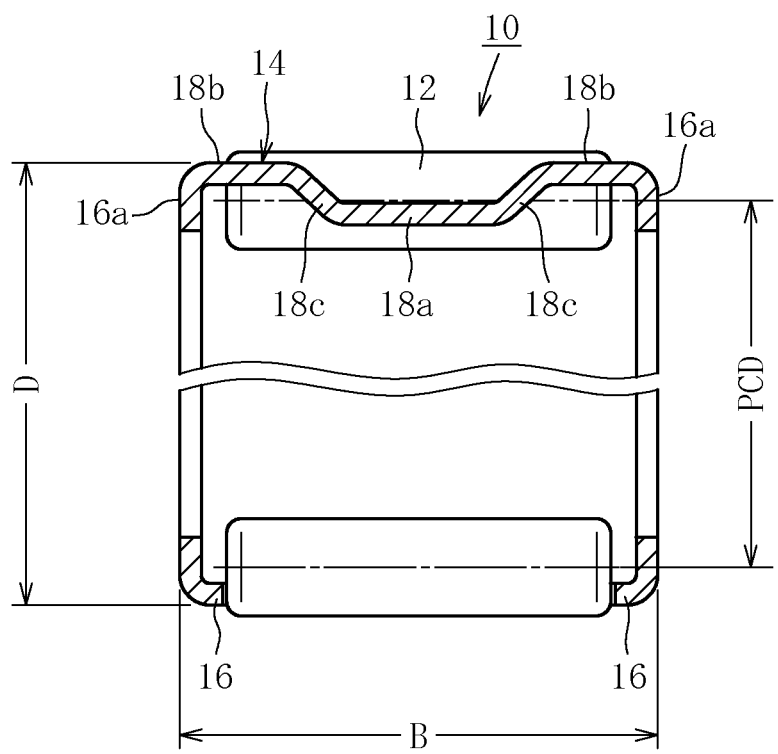
FIG. 3 is a sectional view of a needle roller and cage assembly.
Figure 5A:
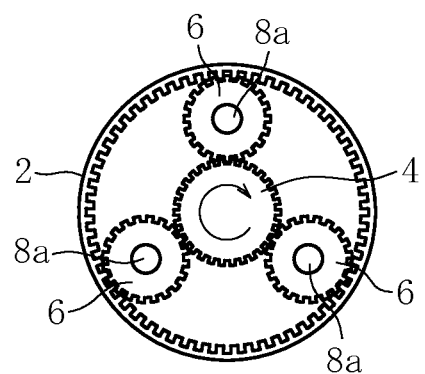
FIG. 5A is a simplified view of a planetary gear device.
Figure 5B:
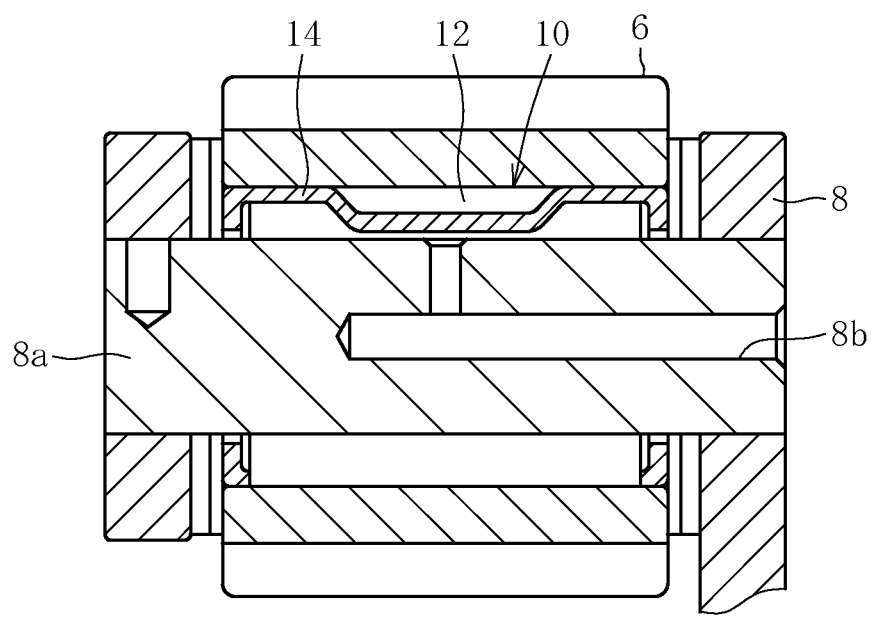
FIG. 5B is a sectional view of a pinion portion of FIG. 5A.

First, referring to FIG. 3, a needle roller and cage assembly 10 comprises a large number of needle rollers 12 arranged in a single row, and a cage 14 into which the large number of needle rollers 12 are assembled. As illustrated in FIGS. 1A and 1B and FIGS. 2A and 2B, the cage 14 comprises a pair of annular sections 16 spaced apart from each other in an axial direction, and a plurality of pillar sections 18 extending in the axial direction, for coupling the annular sections 16 to each other. A width B of the cage 14 is larger than a diameter D thereof. When taking a specific example, it is preferred that the relationship between the width B and the diameter D satisfy D<B<2D. In FIG. 3, reference symbol D denotes the diameter of the cage 14, and reference symbol B denotes the width of the cage 14. Hatched regions in FIG. 1B, that is, regions each ranging from the annular section 16 to a part of the pillar section 18 on an outer circumferential surface of the cage 14 are herein referred to as "radially outer guide surface". During rotation, the cage 14 is guided while the radially outer guide surface thereof is held in contact with an inner circumferential surface of a pinion 6 (FIG. 5B), which is a so-called outer race guiding type.

The sectional shape of the cage 14 may be an M-shape as illustrated in FIG. 2A or a V-shape as illustrated in FIG. 2B. The M-shape and the V-shape are different from each other only in that an inward flange 16a, which is formed on an outer end of each of the annular sections 16 in the M-shape, is not formed in the V-shape.

As already described, the pillar section 18 of the cage 14 comprises a roller retaining portion 18a on a radially inner side, which is formed at a center portion thereof in the axial direction, and a roller retaining portion 18b on a radially outer side, which is formed at each end portion thereof in the axial direction. The expressions "radially inner side" and "radially outer side" herein indicate a radially inner side or a radially outer side with respect to a roller pitch circle diameter PCD (FIG. 3). That is, the roller retaining portion 18a on the radially inner side and the roller retaining portion 18b on the radially outer side are positioned opposite to each other across the roller pitch circle. The roller retaining portion 18a on the radially inner side and the roller retaining portion 18b on the radially outer side are continuous with each other through an oblique portion 18c. The oblique portion 18c comprises a first relief portion 22 for avoiding interference with an outer circumferential surface of the needle roller 12. An outer end of the first relief portion 22 corresponds to an inner end of the roller retaining portion 18b on the radially outer side.

Pockets 20 for receiving the needle rollers 12 are each formed between the adjacent pillar sections 18. The pockets 20 are formed equiangularly, and the needle roller 12 is received in each of the pockets 20. The pocket 20 is formed through the cage 14 in a radial direction, and the needle roller 12 partially protrudes from the cage 14. An outer circumferential surface of a pinion shaft 8a (FIG. 5B) serves as the inner raceway surface for the needle rollers 12, and the inner circumferential surface of the pinion 6 serves as an outer raceway surface for the needle rollers 12. The needle rollers 12 roll on those raceway surfaces.

Figure 1A:
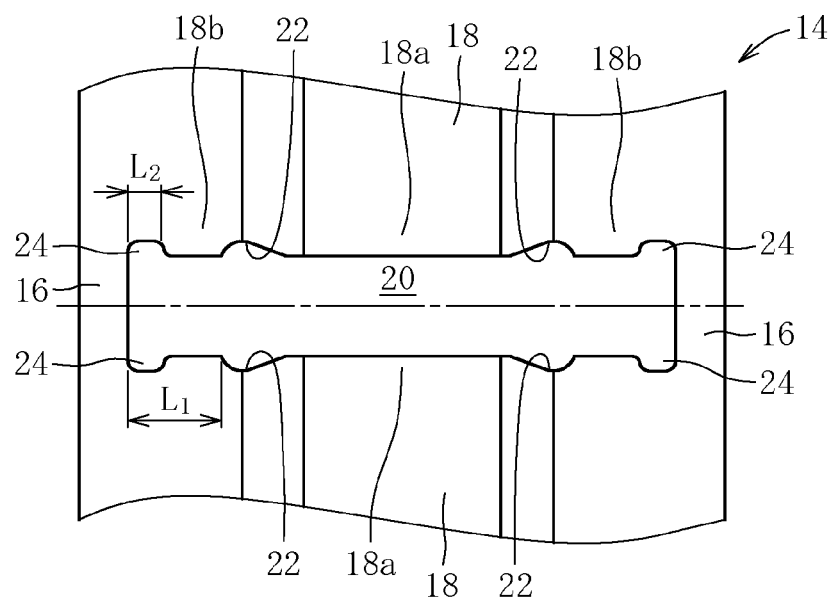
FIG. 1A is a developed view of a pocket portion of a cage.
Figure 1B:
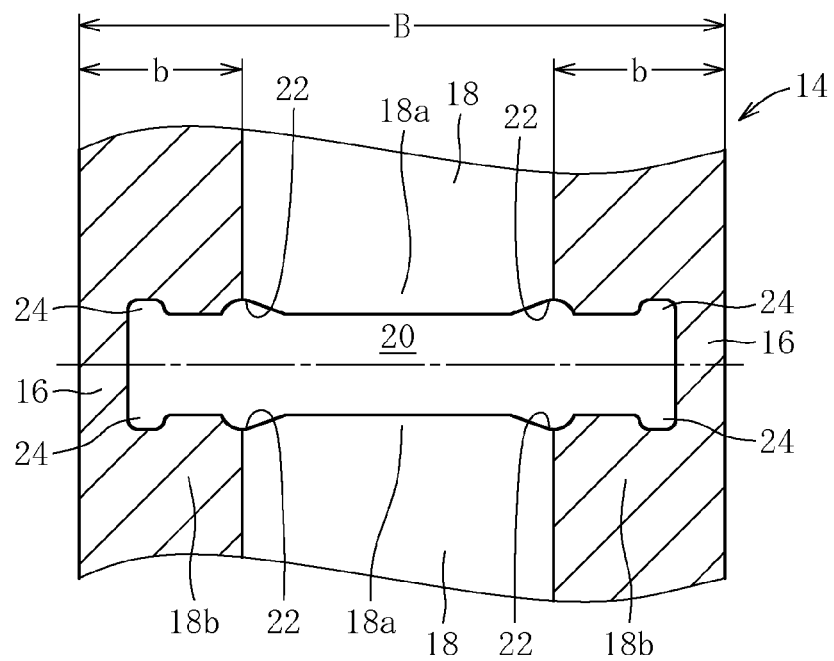
FIG. 1B is a schematic view of the pocket portion of the cage.

As illustrated in FIGS. 1A and 1B, each of the pockets 20 is configured to receive the needle roller 12, and hence has a rectangular shape with its short sides being parallel to the annular sections 16. A second relief portion 24 is formed in each of four corners of the pocket 20 by partially cutting out the pillar sections 18. The second relief portion 24 extends in the axial direction of the cage 14 from a position at which the short side of the pocket 20 is elongated in a circumferential direction to an outer end of the roller retaining portion 18a on the radially outer side. In the example illustrated in FIGS. 1A and 1B, the second relief portion 24 also has a rectangular shape with its long sides extending in parallel to the axial direction of the cage 14. Reference symbol $L_2$ denotes an axial dimension of the second relief portion 24. Reference symbol $L_1$ denotes an axial dimension from an outer end of the second relief portion 24, that is, the short side of the pocket 20 to the inner end of the roller retaining portion 18b on the radially outer side.

The "outer end" and "inner end" as used herein are expressions with one of both end surfaces of the cage being set as a reference. An end closer to the end surface is referred to as "outer end", and an end farther from the end surface is referred to as "inner end". When the axial dimension $L_2$ of the second relief portion 24 is changed, the position of the outer end of the roller retaining portion 18b on the radially outer side is changed, and therefore an axial dimension of the roller retaining portion 18b on the radially outer side ($L_1$-$L_2$) is also changed.

It is preferred that the axial dimension $L_2$ of the second relief portion 24 be 40% or more and 70% or less of the dimension $L_1$. When the axial dimension $L_2$ of the second relief portion 24 is less than 40% of the dimension $L_1$, specifically, is 35% of the dimension $L_1$, an effect (of extending life) due to the improvement in oil lubrication performance cannot be observed clearly. On the other hand, when the axial dimension $L_2$ falls within a range of 40% or more and 80% or less of the dimension $L_1$, the effect of extending life can be observed. However, when the axial dimension $L_2$ exceeds 70% of the dimension $L_1$, the length of the roller retaining portion 18b on the radially outer side becomes smaller, and hence the retaining force for the needle roller 12 is reduced. In addition, when the needle roller 12 is long, the self-weight of the needle roller 12 is large accordingly. Therefore, the needle roller 12 may fall off the cage 14 due to vibration.

The dimension $L_1$ and the dimension $L_2$ have such a relationship that, when the dimension $L_1$ is increased, the dimension $L_2$ is reduced. In view of the above, the lower limit of the axial dimension $L_2$ of the second relief portion 24 is set to 40% of the dimension $L_1$, and accordingly, the axial dimension of the roller retaining portion 18a on the radially outer side is reduced. The roller retaining portion 18a corresponds to a portion to be brought into contact with the outer circumferential surface of the needle roller, and hence is subjected to a process such as transfer pressing. Due to the process, a width surface of the pillar section may be deformed. Therefore, when the axial dimension of the roller retaining portion 18a is reduced, an adverse effect on the pillar section, which may be caused by the processing force generated due to the process on the roller retaining portion 18a, can be avoided. Further, when the axial dimension of the roller retaining portion 18a is excessively reduced, a trouble may be caused when retaining or guiding the needle roller 12. Thus, the upper limit of the axial dimension $L_2$ of the second relief portion 24 is kept to 70% of the dimension $L_1$. With this, the axial dimension of the roller retaining portion 18a on the radially outer side is secured, and thus the needle roller 12 is avoided from falling off the cage 14.

The cage 24 is manufactured by press-forming a cylindrical material into an M-shape or a V-shape so as to punch out pockets, or in a case of a welded cage, the cost can be reduced. An overview of manufacturing steps of the welded cage is described as follows.

(a) As a material, band-like steel, which is obtained by shearing, with a slitter, a cold-rolled steel plate excellent in formability such as SPC into a predetermined width, is used.
(b) The band-like steel is subjected to press working so that a basic sectional shape of the cage (M-shape or V shape) is formed.
(c) Pockets are punched out so as to be formed at a predetermined pitch in a longitudinal direction of the band-like steel. After that, the band-like steel is cut into a predetermined length in consideration of a welding margin on each end.

(d) The band-like steel is bent into a ring shape.

(e) Both the end portions are brought into abutment against each other so as to be welded, to thereby obtain a product.

The cage as the product obtained as described above is subjected to heat treatment, such as nitrocarburizing treatment and carburizing-and-quenching, so as to remove strain caused due to the welding and form a hardened surface layer on a surface of the cage. In this manner, the abrasion resistance and the mechanical strength are enhanced.

When the second relief portion is formed into an arc shape, and a width dimension b (FIG. 1B) of the radially outer guide surface of the cage 14 is set larger without changing a radius of curvature, the axial dimension of the roller retaining portion 18b on the radially outer side becomes larger. In this case, the amount of a process (transfer pressing or burnishing process), which is performed so as to form the roller retaining portion 18b, is increased, and hence the width surface of the pillar section 18 may be deformed. When the axial dimension of the roller retaining portion 18b is to set smaller, it is necessary that the radius of curvature of the second relief portion be set larger. As a result, a width of the pillar section 18 becomes smaller, and thus the strength of the cage is lowered. In view of the above, as the second relief portion 24, the relief portion of the present invention is formed so as to have a rectangular shape with its axial dimension increased with respect to a dimension of the cage in the circumferential direction in place of the related-art general relief portion having a uniform radius of curvature. When the second relief portion is formed into the above-mentioned shape so that the axial dimension $L_2$ of the second relief portion 24 is changed, the position of the outer end of the roller retaining portion 18a on the radially outer side as well as the width b of the radially outer guide surface can be adjusted.

Note that, when the width b of the radially outer guide surface of the cage 14 is set smaller, the above-mentioned problems can be solved. However, in the application that involves rotation and revolution as in a case of the planetary gear mechanism, the load to be applied to a radially outer surface of the cage 14 is large, and hence, when the width b of the radially outer guide surface of the cage 14 is set smaller, the cage 14 may be damaged. Therefore, a width b+b of the radially outer guide surfaces is secured so as to be 35% or more of the width B of the cage 14. When the width b of the radially outer guide surface is increased, the outer end of the roller retaining portion 18a on the radially outer side is shifted inward. However, when the outer end of the roller retaining portion 18a on the radially outer side is shifted excessively inward, an interval between the roller retaining portions 18a on both sides becomes smaller, and hence the needle rollers 12 may be skewed, thus leading to an early damage. Therefore, the upper limit of the width b+b of the radially outer guide surfaces is set to 60% of the width B of the cage 14. In short, it is preferred that the axial dimension b+b of the radially outer guide surfaces of the cage 14 be set to 35% or more and 60% or less of the width B of the cage.

Figure 4A:
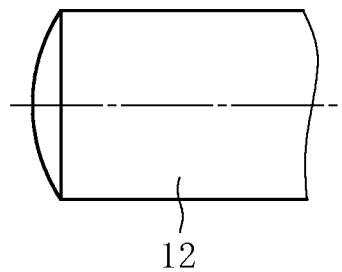
FIG. 4A is a front view of a type-A needle roller.
Figure 4B:
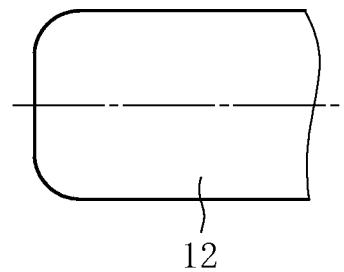
FIG. 4B is a front view of a type-F needle roller.

The needle roller 12 comprises a type-A needle roller 12 having a rounded end surface as illustrated in FIG. 4A and a type-F needle roller 12 having a planer end surface as illustrated in FIG. 4B. When the type-A needle roller 12 is employed, a clearance is secured between the end surface of the needle roller 12 and the short side of the pocket 20 of the cage 14. In addition, the clearance has a larger area than in a case of employing the type-F needle roller having the planer end surface. Further, the second relief portion 24 is positioned so as to overlap with the clearance, and hence a sufficient amount of the lubricating oil is supplied to an end portion of the needle roller 12. Further, the lubricating oil, which passes from the radially inner side to the radially outer side through the second relief portion 24, is supplied to a portion between the radially outer guide surface and the inner circumferential surface of the pinion 6 (FIG. 5B), to thereby perform the lubrication.

As described above, in the above-mentioned embodiment, the type-A is employed for the end surface of the needle roller 12, and the second relief portion 24 of the pocket 20 of the cage 14 is elongated in the axial direction. As a result, the sectional area of a space, which is secured so as to extend between the end portion of the needle roller 12 and the cage 14 in the radial direction, is increased, and the oil lubrication performance of the lubricating oil is improved. Therefore, the lubricating oil is sufficiently fed to the end portion of the needle roller 12, at which the edge stress is liable to be generated, so as to form an oil film. In this manner, the life of the bearing can be extended. Further, the oil lubrication performance is enhanced, and thus even a single oil lubrication hole 8b formed in the pinion shaft 8a (FIG. 5B) is sufficient. The process of forming the oil lubrication hole 8b in the pinion shaft 8a is minimized, and hence the cost can be reduced.

REFERENCE SIGNS LIST 10 needle roller and cage assembly
12 needle roller
14 cage
16 annular section
16a inward flange
18 pillar section
18a roller retaining portion (radially inner side)
18b roller retaining portion (radially outer side)
18c oblique portion
20 pocket
22 first relief portion
24 second relief portion

The invention claimed is:

1. A needle roller and cage assembly, comprising:
a plurality of needle rollers arranged in a single row; and
a cage having a width dimension larger than a diameter thereof, the cage comprising:
    a pair of annular sections spaced apart from each other in an axial direction of the cage; and
    a plurality of pillar sections extending in the axial direction, for coupling the pair of annular sections to each other, the plurality of pillar sections each comprising:
        a roller retaining portion on a radially inner side with respect to a roller pitch circle diameter, the roller retaining portion on the radially inner side being formed at a center portion of a corresponding one of the plurality of pillar sections in the axial direction;
        a roller retaining portion on a radially outer side with respect to the roller pitch circle diameter, the roller retaining portion on the radially outer side being formed at each end portion of the corresponding one of the plurality of pillar sections in the axial direction; and
        an oblique portion through which the roller retaining portion on the radially inner side and the roller retaining portion on the radially outer side are continuous with each other, the oblique portion comprising a first relief portion formed therein, for avoiding interference with the needle rollers, wherein the plurality of pillar sections form pockets for receiving the needle rollers, each of the pockets has a rectangular shape with its short sides being parallel to the pair of annular sections, each of the pockets comprises a second relief portion in each of four corners thereof, the second relief portions being formed by partially cutting out each of the plurality of pillar sections, each of the second relief portions extends in the axial direction of the cage from a position at which one of the short sides of each of the pockets is elongated in a circumferential direction of the cage to an outer end of the roller retaining portion on the radially outer side, and each of the second relief portions has a portion extending parallel to the axial direction of the cage, the cage is an outer race guiding cage, the cage having an outer circumferential surface including a radially outer guide surface located in a region from one of the annular sections to at least an inner end of the roller retaining portion on the radially outer side, an axial length of the roller retaining portion on the radially inner side is longer than an axial length of the roller retaining portion on the radially outer side, and an axial dimension of the second relief portion is set to 40% or more and 70% or less of an axial dimension from the one of the short sides of each of the pockets to the inner end of the roller retaining portion on the radially outer side.

2. The needle roller and cage assembly according to claim 1, wherein a sectional shape of the cage comprises an M-shape or a V-shape.

3. The needle roller and cage assembly according to claim 1, wherein an axial dimension of the radially outer guide surface of the cage is set to 35% or more and 60% or less of a total width of the cage.

4. The needle roller and cage assembly according to claim 3, wherein an end surface of each of the needle rollers comprises a rounded surface.

5. A planetary gear mechanism comprising:
the needle roller and cage assembly according to claim 3; and
a pinion supported by the needle roller and cage assembly.

6. The planetary gear mechanism according to claim 5, wherein the radially outer guide surface of the cage is in contact with an inner circumferential surface of the pinion.

7. The needle roller and cage assembly according to claim 2, wherein an end surface of each of the needle rollers comprises a rounded surface.

8. A planetary gear mechanism comprising:
the needle roller and cage assembly according to claim 2; and
a pinion supported by the needle roller and cage assembly.

9. The planetary gear mechanism according to claim 8, wherein the radially outer guide surface of the cage is in contact with an inner circumferential surface of the pinion.

10. The needle roller and cage assembly according to claim 1, wherein an end surface of each of the needle rollers comprises a rounded surface.

11. A planetary gear mechanism comprising:
the needle roller and cage assembly according to claim 10; and
a pinion supported by the needle roller and cage assembly.

12. The planetary gear mechanism according to claim 11, wherein the radially outer guide surface of the cage is in contact with an inner circumferential surface of the pinion.

13. A planetary gear mechanism comprising:
the needle roller and cage assembly according to claim 1; and
a pinion supported by the needle roller and cage assembly.

14. The planetary gear mechanism according to claim 13, wherein the radially outer guide surface of the cage is in contact with an inner circumferential surface of the pinion.

15. The needle roller and cage assembly according to claim 2, wherein an axial dimension of the radially outer guide surface of the cage is set to 35% or more and 60% or less of a total width of the cage.

16. The needle roller and cage assembly according to claim 15, wherein an end surface of each of the needle rollers comprises a rounded surface.

* * * * *